United States Patent
Wen et al.

(10) Patent No.: US 8,254,249 B2
(45) Date of Patent: Aug. 28, 2012

(54) SESSION RESILIENCE PRIORITIZATION QUEUING MECHANISM TO MINIMIZE AND ELIMINATE PACKET LOSS

(75) Inventors: Renhua Wen, San Ramon, CA (US); Brian Kean, Cincinnati, OH (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 491 days.

(21) Appl. No.: 12/537,115

(22) Filed: Aug. 6, 2009

(65) Prior Publication Data
US 2011/0032814 A1   Feb. 10, 2011

(51) Int. Cl.
H04L 12/28 (2006.01)
(52) U.S. Cl. .................. 370/218; 370/244; 370/412
(58) Field of Classification Search .................. None
See application file for complete search history.

(56) References Cited

U.S. PATENT DOCUMENTS

| | | | |
|---|---|---|---|
| 6,775,542 B1 * | 8/2004 | Vilander et al. | 455/423 |
| 7,200,110 B1 | 4/2007 | Burns et al. | |
| 7,440,494 B2 * | 10/2008 | Baba | 375/219 |
| 2003/0198180 A1 | 10/2003 | Cambron | |
| 2006/0083227 A1 | 4/2006 | Eldar | |
| 2008/0285435 A1 | 11/2008 | Abdulla et al. | |
| 2008/0285472 A1 | 11/2008 | Abdullah et al. | |

OTHER PUBLICATIONS

International Search Report and Written Opinion, Application No. PCT/IB2010/053578, dated Mar. 4, 2011, 19 pages.

* cited by examiner

*Primary Examiner* — Kwang B Yao
*Assistant Examiner* — Alex Skripnikov
(74) *Attorney, Agent, or Firm* — Blakely Sokoloff Taylor & Zafman, LLP

(57) ABSTRACT

A method for managing a plurality of subscriber sessions tied to mobile devices in a router, each subscriber session of the plurality of subscriber sessions assigned to a line card in the router, the line card implementing a data plane entity and a control card implementing a control plane entity, the method comprising: redistributing each subscriber session in the plurality of subscriber sessions assigned to a failed line card in the router to minimize packets lost and maximize subscriber session retention, redistributing including classifying each subscriber session in the plurality of subscriber sessions into a plurality of priority queues, in response to detection of the failed line card, transferring each subscriber session in the plurality of subscriber sessions assigned to the failed line card to one of a plurality of operating line cards in priority queue order.

16 Claims, 4 Drawing Sheets

SESSION RESILIENCE PRIORITIZATION QUEUING MECHANISM TO MINIMIZE AND ELIMINATE PACKET LOSS

FIELD OF THE INVENTION

Embodiments of the present invention relate to a system for subscriber sessions management. Specifically, embodiments of the invention relate to a method for reprovisioning subscriber sessions for failed line cards or in response to the detection of new line cards.

BACKGROUND

In a typical router platform, there are one or more control cards and multiple line cards. These router platforms are used to manage subscriber sessions. A subscriber session is a communications session between two endpoints such as a mobile device or computing device. A subscriber session is managed by the router platform using two entities, a control plane entity and a data plane entity. The control plane entity is implemented in a control card. The data plane entity is implemented in a line card. The control plane entity is set up first and is invoked by application-specific protocol signaling messages from the endpoints. The control plane entity can perform functions including user authentication, authorization, accounting and user address allocation. The data plane entity is set up at a line card or across line cards and services data packets from subscriber sessions that are assigned or provision to it by the control plane. These services can include routing the subscriber session, quality of service enforcement, access control list implementation, packet filtering and packet counting. Subscriber sessions are typically provisioned to a line card in the sequence that they are set up by the control card.

Router platforms can serve as Packet Data Network gateways (PGWs), serving gateways (SGWs), or combined gateways (PGW and SGW) for evolved packet systems (EPSs). Subscriber sessions can be created for mobile users or "user equipment." These subscriber sessions are normally in one of two states, idle or active. When a subscriber session is idle, there is no radio traffic channel allocated for the user equipment and there is no uplink traffic from the user equipment. When a subscriber session is active, there is either radio traffic channel allocated to the user equipment or there is uplink traffic from the user equipment.

Subscriber sessions are distributed to all line cards in a router platform by a load balancing algorithm. Load balancing algorithms attempt to evenly distribute a load across all available line cards. If a line card is lost due to a software failure or a hardware failure of the line card, all sessions on the lost card must be redistributed or reprovisioned to other active line cards or the services provided to the subscriber sessions assigned to these cards are lost. Line cards typically service a large number of subscriber sessions.

In response to detection of a lost line card, the control card is responsible for handling this event. The control card may do nothing, in which case all subscriber sessions are lost, requiring that the user equipment reinitiate the connection which would then be provisioned to a new, different line card. In other cases, a control card tends to redistribute and reprovision the subscriber sessions to remaining active line cards. However, this is done by either a random order or based on a time sequence associated with the subscriber sessions (e.g., the time each subscriber session was established).

Similarly, if a control card detects a new line card, the control card either responds to this event by only including the new line card in the provisioning process and load-balancing process for new subscriber sessions or the control card attempts to redistribute subscriber sessions from active line cards to the new line cards, but this results in packet loss for the moved subscriber sessions.

SUMMARY

The embodiments of the invention include a method for managing a plurality of subscriber sessions tied to mobile devices in a router. Each subscriber session of the plurality of subscriber sessions is assigned to a line card in the router. The line card implements a data plane entity and a control card implements a control plane entity. The method comprises redistributing each subscriber session in the plurality of subscriber sessions assigned to a failed line card in the router to minimize packets lost and maximize subscriber session retention. Redistributing includes classifying each subscriber session in the plurality of subscriber sessions into a plurality of priority queues. In response to detection of the failed line card, each subscriber session in the plurality of subscriber sessions assigned to the failed line card is transferred to one of a plurality of operating line cards in priority queue order.

The embodiments of the invention include a network comprising a plurality of wireless mobile devices, a plurality of base stations to wirelessly communicate with the plurality of wireless mobile devices, a router in communication with the plurality of base stations and mobile devices to manage a plurality of subscriber sessions tied to the plurality of wireless mobile devices. The router has a control card and a plurality of line cards, the router to minimize packet loss in response to a failure of one line card of the plurality of line cards by classifying each of the plurality of subscriber sessions assigned to a failed line card into a plurality of priority queues and by transferring each of the plurality of subscriber sessions assigned to the failed line card to one of a plurality of operating line cards in priority queue order.

The embodiments of the invention include a network element for managing a plurality of subscriber sessions associated with a plurality of mobile devices. The network element minimizes packet loss and session failure. The network element comprises a plurality of line cards implementing a data plane, the line cards to service traffic from the plurality of mobile devices, and a control card coupled to the plurality of line cards, the control card to implement a control plane. The control card minimizes packet loss in response to a failure of one line card of the plurality of line cards by classifying each of the plurality of subscriber sessions assigned to a failed line card into a plurality of priority queues and by transferring each of the plurality of subscriber sessions assigned to the failed line card to one of a plurality of operating line cards in priority queue order.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

Figure 1:
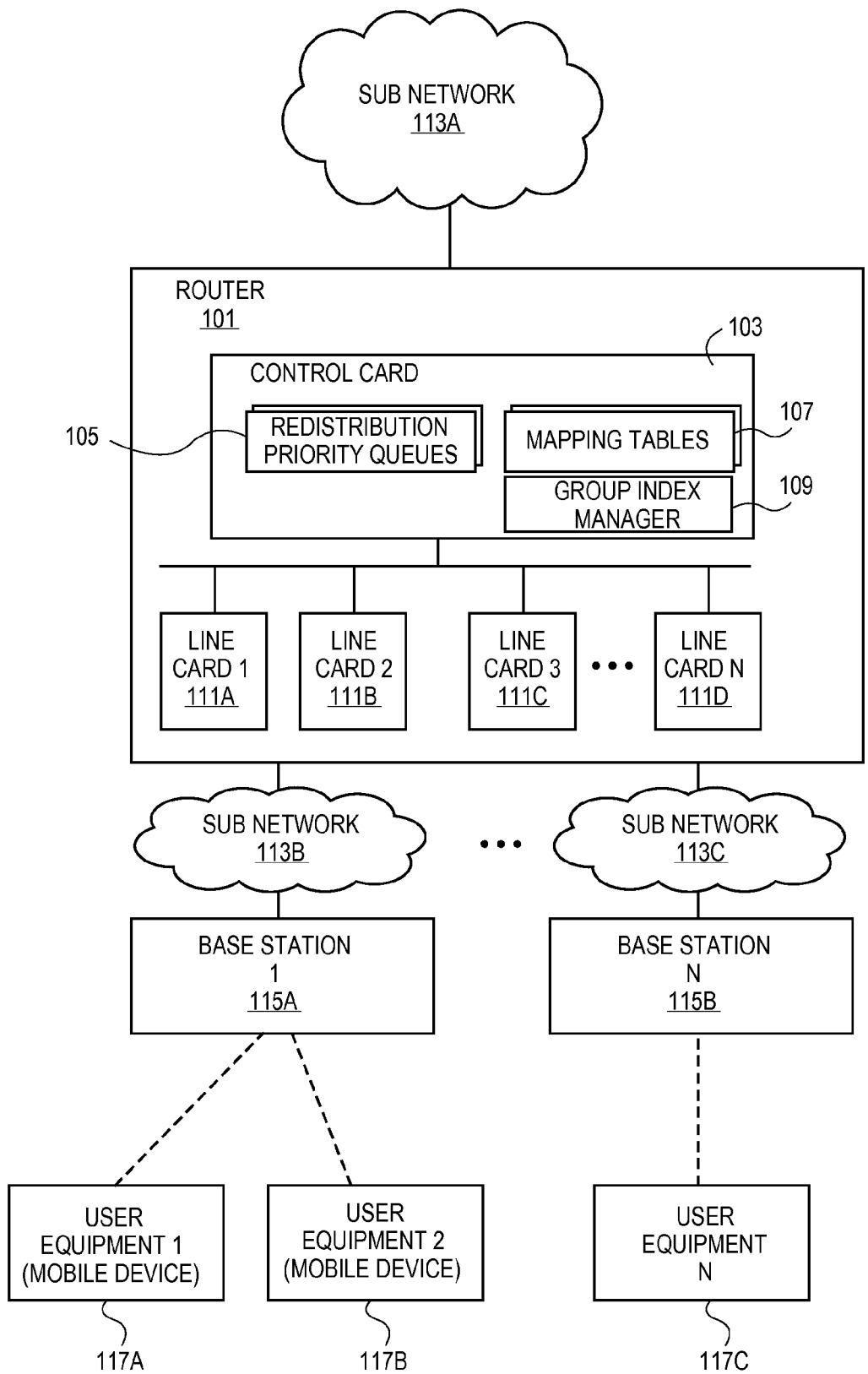
FIG. 1 is a diagram of one embodiment of a network including a router implementing a packet loss minimization technique.

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. Those of ordinary skill in the art, with the included descriptions, will be able to implement appropriate functionality without undue experimentation.

The operations of the flow diagrams will be described with reference to the exemplary embodiment of FIG. 1. However, it should be understood that the operations of the flow diagram can be performed by embodiments of the invention other than those discussed with reference to FIG. 1, and the embodiments discussed with reference to FIG. 1 can perform operations different from those discussed with reference to the flow diagrams of FIGS. 2-4.

The techniques shown in the figures can be implemented using code and data stored and executed on one or more electronic devices (e.g., an end station, a network element (e.g., a router platform), etc.). Such electronic devices store and communicate (internally and/or with other electronic devices over a network) code and data using machine-readable media, such as machine-readable storage media (e.g., magnetic disks; optical disks; random access memory; read only memory; flash memory devices; or phase-change memory). In addition, such electronic devices typically include a set of one or more processors coupled to one or more other components, such as one or more storage devices, user input/output devices (e.g., a keyboard, a touch screen, and a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, endpoints, base stations, etc.). Some network elements are "multiple services network elements" that provide support for multiple networking functions (e.g., routing, bridging, switching, Layer 2 aggregation, session border control, and/or subscriber management, multicast routing, etc.), and/or provide support for multiple application services (e.g., data, voice, and video). Subscriber end points (e.g., servers, workstations, laptops, palm tops, mobile phones, smart phones, multimedia phones, Voice Over Internet Protocol (VOIP) phones, portable media players, GPS units, gaming systems, set-top boxes (STBs), etc.) access content/services provided over the Internet and content/services provided on virtual private networks (VPNs) overlaid on the Internet. The content and/or services are typically provided by or to one or more end points (e.g., user equipment) belonging to a service or content provider (e.g., a cellular network provider) or end points participating in a peer to peer service, and may include public web pages (free content, store fronts, search services, etc.), private web pages (e.g., username/password accessed web pages providing email services, etc.), corporate networks over VPNs, IPTV channels or sources, etc. Typically, subscriber end points are coupled (e.g., through customer premise equipment or base stations coupled to an access network (wired or wirelessly)) to edge network elements, which are coupled (e.g., through one or more core network elements to other edge network elements) to other end points (e.g., user equipment).

The embodiments of the present invention provide a system, network and method for avoiding the disadvantages of the prior art including: where in a router when a line card is lost, services and subscriber sessions assigned to that card may be lost and not redistributed. The users of lost subscriber sessions will experience a loss of service and have to reinitiate the connections. In another scenario, a line card is lost and the subscriber sessions of the lost card are redistributed without any prioritized order. Sessions with active data transfer will experience data packet loss. If the number of sessions to be reprovisioned to other line cards is large, it could take considerable time to complete the reprovisioning. Packets for sessions not yet completely reprovisioned will be dropped, causing service disruption. If the time to provision the active session is too long, the user may terminate the session or the session may be lost. In a scenario where a new line card is added, no redistribution may be done to take advantage of the resources of the new line card, thereby underutilizing the capabilities of the router platform.

In other cases where a new line card is added and sessions are redistributed, the redistribution can take time to complete any reprovisioning of sessions, causing packet loss or subscriber session loss. The embodiments of the present invention overcome these disadvantages by prioritizing subscriber sessions from a lost line card to avoid or minimize packet loss for the subscriber sessions. The subscriber sessions are reprovisioned in an order based on this priority. If a new line card is added, the embodiments of the invention provide redistribution of subscriber sessions to achieve load balance across all line cards while at the same time eliminating packet loss of the reprovisioned subscriber sessions. In each case subscriber sessions are provisioned to a single line card to minimize memory and bandwidth requirements as well as to enable the use of a centralized state that is used for services such as policing, metering, and volume limiting that require subscriber session packets to be processed in one location.

FIG. 1 is a diagram of one embodiment of a network including a router implementing prioritized subscriber session redistribution. The network includes a set of subnetworks 113A-113C, a router 101, a set of base stations 115A, 115B and a set of user equipment 117A-117C. A set as used herein refers to any positive whole number of items including one item. Subnetworks 113A-113C connecting the components of the system can be separate networks, different aspects of the same network or a combination thereof. The subnetworks 113A-113C can be local area networks (LANs), wide area networks (WANs) such as the Internet or similar networks. The subnetworks 113A-113C can include any combination of wired or wireless network elements and lines of communication between the network elements.

The user equipment 117A-117C can be any type of computing device capable of communicating over a network. In one embodiment, the user equipment 117A-11C is a mobile handheld device or cellular communication device that wirelessly communicates with a set of base stations 115A-115B. User equipment 117A-117C can communicate with a base station using any wireless communication protocol or technology including global system for mobile communication (GSM), code division multiple access (CDMA), enhanced data rates for GSM evolution (EDGE), UMTS terrestrial radio access network (UTRAN), long term evolution (LTE) and similar technologies. Any number of base stations 115A-115B may be part of a system and communicate through a set of routers 101 across a set of subnetworks 113B-113C.

The router 101 is a networking element that processes traffic from a plurality of subnetworks 113A-113C. This data traffic may be between user equipment 117A-117C or between any combination of routers and end points. Typically, the subnetworks 113B-113C coupling the base station and router are referred to as downlinks and subnetworks 113A connecting a router to other resources across the Internet to such things as end points providing various application services are referred to as uplinks. The router 101 includes a set of control cards 103 and a set of line cards 111A-111D. The router 101 can contain any number of control cards 103 and line cards 111A-111D. The control cards 103 and line cards communicate across an internal bus, backplane or switch of the router 101. The control card 103 implements a control plane as a software layer that manages the overall distribution of the subscriber sessions. The line cards 111A-11D implement a data plane as a software layer where data forwarding and packet processing are implemented.

Each control card 103 may implement a set of redistribution priority queues 105, mapping tables 107 and a group index manager 109. In other embodiments, a set of control cards provides a control plane that implements these features. Any number of redistribution priority queues 105 can be supported to handle the prioritization of subscriber sessions for purposes of redistribution when a line card is lost. Each priority queue has rules for ranking subscriber sessions with the highest ranking being the first to be reprovisioned and the lowest ranking being the last to be reprovisioned. In one example embodiment, the redistribution priority queues include four queues. The highest priority queue is referred to herein as the NotifyQ. The NotifyQ tracks the subscriber sessions with uplink or downlink data activity notifications that are pending. The second highest priority queue is referred to as the UpdateQ. The UpdateQ includes subscriber sessions with updated network control signaling. The third highest priority queue is the Active-StateQ. Subscriber sessions assigned to the Active-StateQ are subscriber sessions that are active but have not been assigned to the higher priority queues, because they failed to meet the additional criteria of these queues. The lowest priority queue is referred to as the IdleQ. The IdleQ includes all idle subscriber sessions.

A control card or control plane manages the assignment of the subscriber sessions to each of the priority queues as discussed herein below in regard to FIG. 2. Similarly, the control card or control plane manages the redistribution of the subscriber sessions assigned to the priority queues 105 as discussed here and below in regard to FIG. 3.

The mapping table 107 is a data storage structure that tracks the association of a group index with a line card and subscriber session. Each entry in the table matches a group index with an assigned line card number. The entries may also include a list of subscriber sessions tied to a group index. All subscriber sessions are divided into a fixed number of groups and each group is associated with a unique group index. Each subscriber session can be mapped to a particular group index by use of a mapping algorithm. The mapping algorithm may use a session key associated with each subscriber session. The mapping algorithm may be a hashing algorithm or similar algorithm. Processed session keys that yield the same group index result in the associated subscriber sessions being assigned to the same group index. In data traffic processing, when a user packet arrives at the router, the group index is derived from the user packet and is used to look up an entry in the mapping table and to identify the line card that is handling a subscriber session associated with the user packet. The user packet is then sent to the line card for further processing, such as quality of service processing, counting, charging, packet filtering, policy enforcement and similar packet processing.

The mapping table 107 is managed by the group index manager 109. The group index manager 109 creates entries for each of the group indices and manages the assignment of line cards to the group indices. The group index manager 109 also is executed or implemented by the control card or control plane. When a new line card is added, the group index manager 109 also handles the redistribution of subscriber sessions as described below in regard to FIG. 4.

Figure 2:
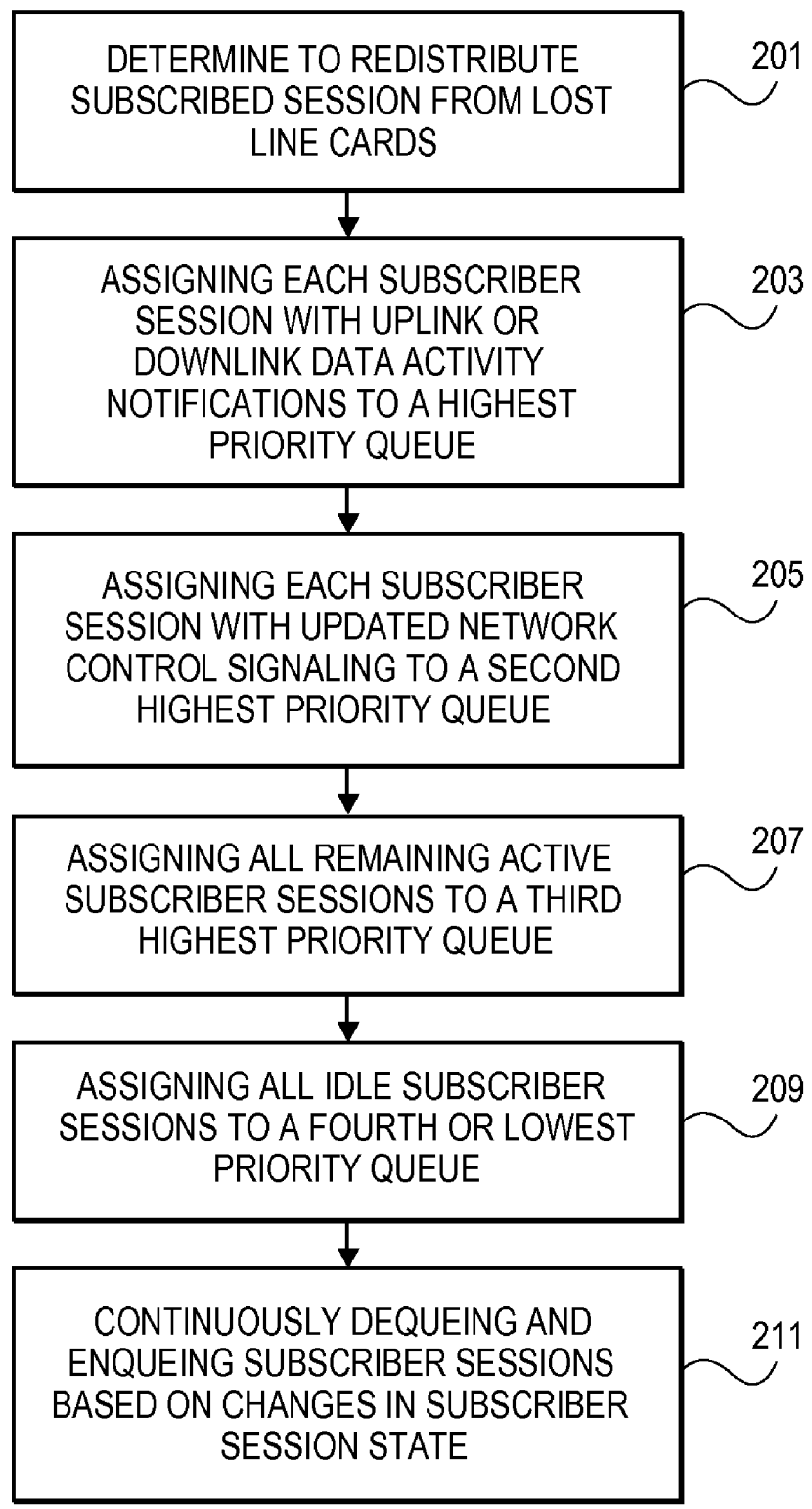
FIG. 2 is a flowchart of one embodiment of a process for redistributing subscriber sessions from a lost line card.

FIG. 2 is a flowchart of one embodiment of a process for assigning subscriber sessions from lost line cards to priority queues. In one embodiment, the process is initiated by the determination that a line card has been lost and that the subscriber sessions from the lost line card should be redistributed (block 201). The lost line card can be detected by any hardware or software failure detection mechanism or process when the line card fails due to software or hardware failure. The control card or control plane may set up a set of priority queues into which each of the subscriber sessions assigned to the lost line card will be placed.

The process of placing the subscriber sessions into priority queues includes traversing a set of subscriber sessions in any order. Each subscriber session's status will be examined by the control plane. Each subscriber session with uplink or downlink data activity notifications is assigned to the highest priority queue (in one embodiment, the highest priority queue is referred to as the NotifyQ) (block 203). Each subscriber session with updated network control signaling is assigned to a second highest priority queue (block 205). The second highest priority queue may be referred to as the UpdateQ.

All remaining active subscriber sessions can be assigned to a third highest priority queue (block 207). The third highest priority queue may be referred to as the Active-StateQ. After all of the active subscriber sessions have been assigned, then all idle subscriber sessions are assigned to a fourth or lowest priority queue (block 209). The fourth or lowest priority queue may be referred to as the IdleQ. Each of the subscriber sessions may be assigned into its respective queue in the order that it is processed or based on any criteria or characteristic of the subscriber session.

The assignment of the subscriber sessions is not static and can be continuously updated if it has not been reprovisioned yet. Subscriber sessions are continuously dequeued and then enqueued into and out of the various priority queues based on changes in the subscriber session state until they are all reprovisioned to line cards. For example, if an Active-StateQ subscriber session becomes idle, it is dequeued from its current priority queue and then enqueued in the IdleQ. Similarly, if an idle subscriber session assigned to the IdleQ has data activity or updated network control signaling associated with it received at the router, then it is dequeued from the IdleQ and enqueued in the appropriate higher priority queue. In one embodiment, in each case where a subscriber session is enqueued in a particular priority queue it is enqueued at the tail of the queue. In other embodiments, other enqueing methods are used to further prioritize subscriber sessions based on any criteria.

Figure 3:
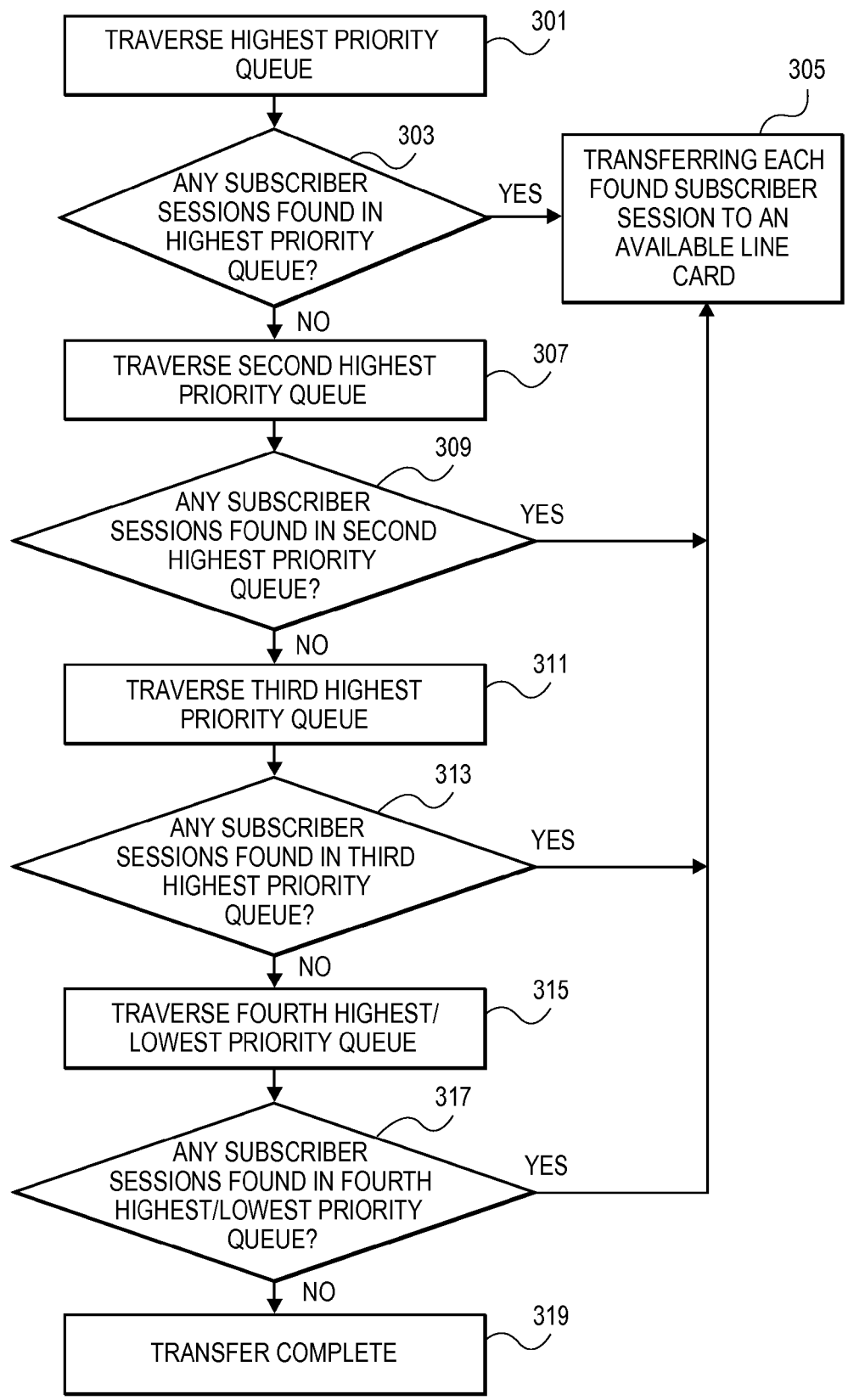
FIG. 3 is a flowchart of one embodiment of a process for redistributing subscriber sessions to available line cards.

FIG. 3 is a flowchart of one embodiment of a process for reprovisioning each of the subscriber sessions to available line cards. This process may be executed in parallel with or after the completion of the process described above with regard to FIG. 2. The process is triggered by the control plane deciding to reprovision subscriber sessions from a lost line card. The control plane then begins to traverse the highest priority queue (block 301) and a determination is made as to whether any subscriber sessions are enqueued in the highest priority queue (block 303). In one embodiment, the highest priority queue may be managed or ordered based on the timing of the signaling or data notification events (e.g., the time order of these events). The oldest in time order events may be given the highest priority within the highest priority queue to diminish the probability that the subscriber sessions will be affected by the reprovisioning.

The traversal process identifies the first subscriber session in any given queue that is being traversed. If a subscriber session is found in the highest priority queue, then the subscriber session is reprovisioned to an available line card (block 305). Starting with the highest priority queue ensures that those subscriber sessions with pending active data to be processed are the first to be transferred to minimize the likelihood of significant packet loss for the subscriber session. In one embodiment, the subscriber sessions are dequeued from the head of the highest priority queue. If a subscriber session is found in the highest priority queue and reprovisioned, then the process starts again by re-traversing the highest priority queue (block 301). The process always begins again at the highest priority queue to ensure that any subscriber session that is re-classified due to changes in its state is caught on each iteration through the traversal of the priority queues.

If no subscriber sessions are found in the highest priority queue, then the second highest priority queue is traversed (block 307). If any subscriber sessions are found in the second highest priority queue (block 309), then that subscriber session is transferred to an available line card (block 305). The process then continues by again traversing the highest priority queue (block 301).

If no subscriber sessions are found in the highest priority queue or the second highest priority queue in a given iteration, then the third highest priority queue is traversed (block 311). A determination is made as to whether any subscriber sessions are present in the third highest priority queue (block 313). If any subscriber sessions are found in the third highest priority queue, then the subscriber session that is found is transferred to an available line card (block 305). The process then continues by traversing the highest priority queue (block 301).

If no subscriber sessions are found in the first three priority queues, then the fourth highest or lowest priority queue is traversed (block 315). Any number of priority queues can be used and four priority queues are provided by way of example. One of ordinary skill in the art would understand that the process can be extended to cover any number of priority queues. If any subscriber sessions are found in the fourth highest priority queue (block 317), then that subscriber session is transferred to an available line card (block 305). The process then continues by traversing the highest priority queue (block 301).

If no subscriber sessions are found in any of the priority queues, then the transfer of the subscriber sessions is complete (block 319). The selection of a line card for the transfer of a subscriber session can be made by any load balancing or distribution algorithm. In one embodiment, an effort is made to transfer the subscriber sessions such that the available line cards all have a roughly equivalent load.

Figure 4:
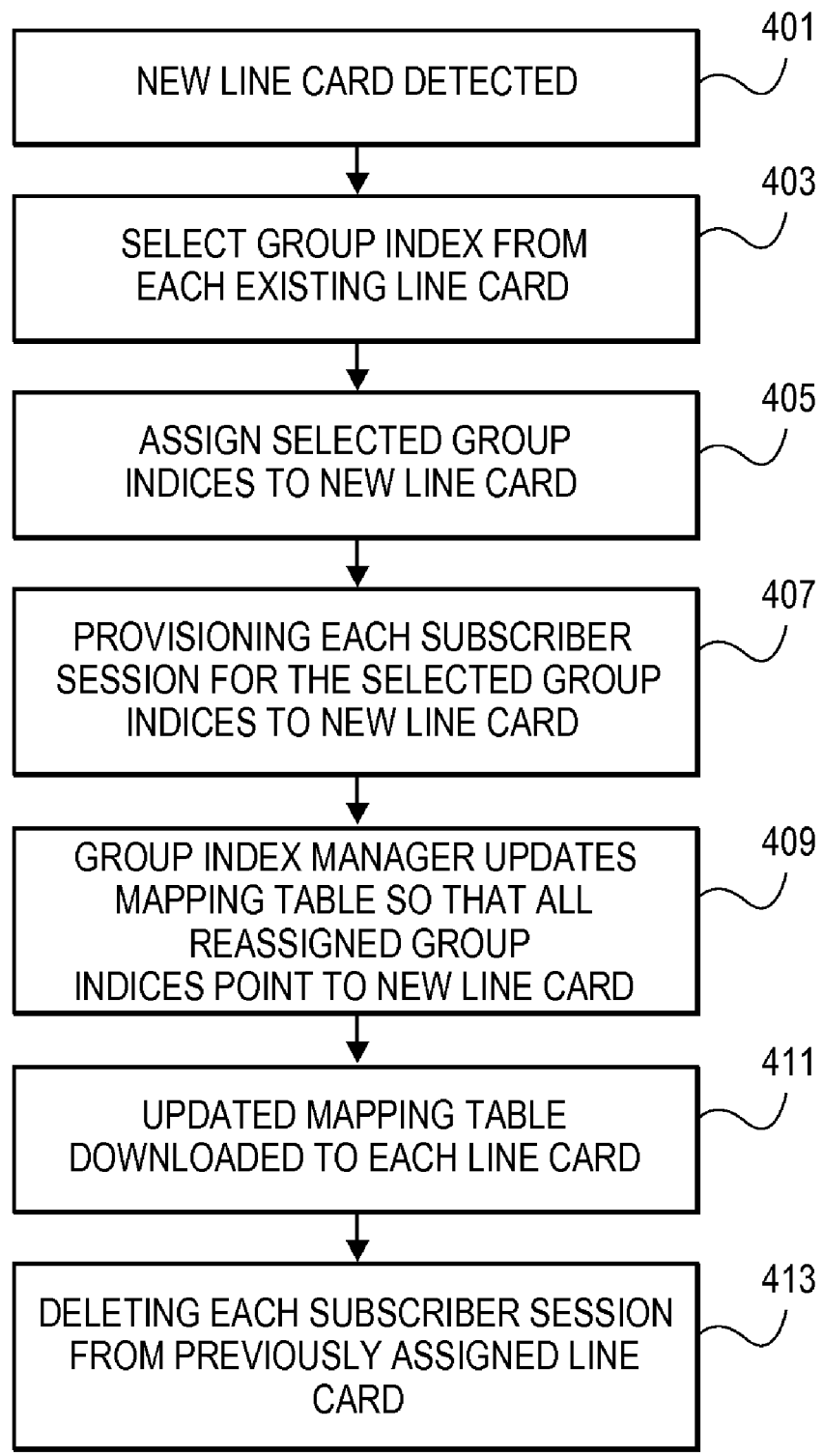
FIG. 4 is a flowchart of one embodiment of a process for redistributing subscriber sessions to a new line card without packet loss.

FIG. 4 is a diagram of one embodiment of a process for redistributing subscriber sessions when a new line card is added to a router platform. The process begins by the detection of a new line card in a router platform. The control card or a control plane may have hardware or software means for detecting the addition of a new line card (block 401). In response to the detection of the new line card, the group index manager selects at least one group index from each existing line card (block 403). Any number of group indices may be selected from each line card depending on the number of subscriber sessions associated with each group index and the overall load in the router platform. The group indices selected when multiple indices are available for each line card can be any distribution or load balancing algorithm. The group indices are tracked in the mapping table which is administered by the group index manager.

Each of the selected group indices is assigned to the new line card (block 405). This is accomplished by updating or notifying the new line card of the group index assignments and recording the assignments in the mapping table. In turn, each of the subscriber sessions of the selected groups is provisioned to the new line card (block 407). The group index manager updates the mapping table so that all reassigned group indices point to the new line card (block 409). Up to this point, each of the new data packets received at the router continue to be processed by the line card to which they were previously assigned. Then the updated mapping table is downloaded to each of the line cards in parallel (block 411). From this point forward, the new line card processes all data packets for the newly assigned subscriber sessions. The subscriber sessions are then deleted from each of the previously assigned line cards (block 413). The reassignment is made before the processing of the data packets by the old line cards is broken. As a result, no traffic loss occurs for the sessions that are reassigned.

Thus, a method, system and apparatus for subscriber session redistribution have been described. It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method in a router for managing a plurality of subscriber sessions associated with a plurality of mobile devices, wherein each subscriber session is assigned to one of a plurality of line cards, the method comprising the steps of:
   detecting a failed line card; and
   redistributing each subscriber session assigned to the failed line card to minimize packets lost and maximize subscriber session retention, the step of redistributing including:
      classifying, in response to detection of the failed line card, each subscriber session assigned to the failed line card into a plurality of priority queues, the step of classifying including:

assigning each subscriber session assigned to the failed line card with uplink or downlink data activity notifications to a highest one of the plurality of priority queues; and assigning each subscriber session assigned to the failed line card with updated network control signaling to a second highest one of the plurality of priority queues; and transferring each subscriber session assigned to the failed line card to another one of the plurality of line cards as a function of priority queue order.

2. The method of claim 1, wherein the step of transferring each subscriber session assigned to the failed line card comprises the step of:

traversing the highest priority queue and transferring each queued subscriber session in the highest priority queue to another one of the plurality of line cards until the highest priority queue is empty.

3. The method of claim 1, wherein the steps of transferring each subscriber session comprises the step of:

traversing the second highest priority queue when the highest priority queue is empty and transferring each queued subscriber session in the second highest priority queue to another one of the plurality of line cards.

4. The method of claim 1, further comprising the step of:

dequeueing one of the plurality of subscriber sessions from a third highest or lower queue and enqueueing the one of the plurality of subscriber sessions to a second highest or higher queue in response to a live control signal update.

5. The method of claim 1, further comprising the steps of:

detecting a new line card added to the router;

dividing the plurality of subscriber sessions into a plurality of groups, wherein each of the plurality of groups has a separate group index;

assigning a plurality of group indices for the plurality of groups to the new line card;

provisioning on the new line card those subscriber sessions in those of the plurality of groups having the group indices assigned to the new line card; and deleting each subscriber session assigned to the new line card from a previously assigned line card without loss of any packets.

6. The method of claim 5, further comprising the step of:

managing in at least one control card a mapping table with a plurality of entries, wherein each entry in the table corresponds to a group index and identifies an assigned line card, wherein the mapping table is adapted to be updated to reflect a reassignment after completion of the step of provisioning those subscriber sessions in those of the plurality of groups having the group indices assigned to the new line card.

7. A network comprising:

a plurality of wireless mobile devices;

a plurality of base stations to wirelessly communicate with the plurality of wireless mobile devices;

a router in communication with the plurality of base stations and the plurality of mobile devices, wherein the router is adapted to manage a plurality of subscriber sessions associated with the plurality of wireless mobile devices, wherein the router has a control card and a plurality of line cards, wherein the router is adapted to minimize packet loss in response to a failure of one line card of the plurality of line cards by classifying each subscriber session of the plurality of subscriber sessions assigned to a failed line card into a plurality of priority queues, and by transferring each subscriber session assigned to the failed line card to another of the plurality of line cards in priority queue order, wherein the router is adapted to assign each subscriber session assigned to the failed line card with uplink or downlink data activity notifications to a highest priority queue of the plurality of priority queues, and wherein the router is adapted to assign each subscriber session assigned to the failed line card with updated network control signaling to a second highest priority queue of the plurality of priority queues.

8. The network of claim 7, wherein the router is adapted to traverse the highest priority queue and adapted to transfer each queued subscriber session in the highest priority queue to another of the plurality of line cards.

9. The network of claim 7, wherein the router is adapted to maintain a group index manager in the control card, wherein the group index manager is adapted to maintain a mapping table with a plurality of entries, wherein each entry in the mapping table corresponds to a group index and identifies an assigned line card hosting all sessions of that group, wherein the mapping table is adapted to be updated to reflect a reassignment after provisioning of each subscriber session of the plurality of subscriber sessions assigned to the previous line card to the new line card completes.

10. The network of claim 9, wherein the router is adapted to detect a new line card added to the router, wherein the router is adapted to divide the plurality of subscriber sessions into a plurality of groups, wherein each of the plurality of groups has a separate group index, wherein the router is adapted to assign a plurality of group indices to the new line card, wherein the router is adapted to provision to the new line card each subscriber session for the plurality of group indices reassigned to the new line card, and wherein the router is adapted to delete each subscriber session for the plurality of group indices reassigned to the new line card from a previously assigned line card without loss of any packets.

11. The network of claim 7, wherein the router is adapted to dequeue a subscriber session assigned to the failed line card from a third highest or lower priority queue of the plurality of priority queues and wherein the router is adapted to enqueue the subscriber session assigned to the failed line card to a second highest or higher queue in the plurality of priority queues in response to a live control signal update.

12. A network element for managing a plurality of subscriber sessions associated with a plurality of mobile devices, wherein the network element is adapted to minimize packet loss and session failure, the network element comprising:

a plurality of line cards implementing adapted to service traffic from the plurality of mobile devices;

at least one control card coupled to the plurality of line cards, wherein the control card minimizes packet loss in response to a failure of one line card of the plurality of line cards by classifying each subscriber session assigned to the failed line card into a plurality of priority queues, and by transferring each subscriber session assigned to the failed line card to another of the plurality of line cards in priority queue order, wherein the at least one control card is adapted to assign each subscriber session assigned to the failed line card with uplink or downlink data activity notifications to a highest priority queue of the plurality of priority queues, and wherein the at least one control card is adapted to assign each subscriber session assigned to the failed line card with updated network control signaling to a second highest priority queue of the plurality of priority queues.

13. The network element of claim 12, wherein the at least one control card is adapted to traverse the highest priority queue and to transfers each queued subscriber session in the highest priority queue to another of the plurality of line cards until the highest priority queue is empty.

14. The network element of claim 12, wherein the at least one control card is adapted to maintain a group index manager, wherein the group index manager is adapted to maintain a mapping table with a plurality of entries, wherein each entry in the mapping table corresponds to a group index and identifies an assigned line card, wherein the mapping table is adapted to be updated to reflect a reassignment after completion of reprovisioning of each subscriber session of the group index to the new line card.

15. The network element of claim 12, wherein the at least one control card is adapted to detect a new line card added to the router, wherein the at least one control card is adapted to divide the plurality of subscriber sessions into a plurality of groups, wherein each of the plurality of groups has a separate group index, wherein the at least one control card is adapted to assign a plurality of group indices to the new line card, wherein the at least one control card is adapted to provision each subscriber session at the new line card for each subscriber session for the plurality of group indices reassigned to the new line card, and wherein the control card is adapted to delete each subscriber session for the plurality of group indices reassigned to the new line card from a previously assigned line card without loss of any packets.

16. The network element of claim 12, wherein the at least one control card is adapted to dequeue a subscriber session from a third highest or lower priority queue of the plurality of priority queues and wherein the at least one control card is adapted to enqueue the subscriber session to a second highest or higher queue in response to a live control signal update.

* * * * *

UNITED STATES PATENT AND TRADEMARK OFFICE
CERTIFICATE OF CORRECTION

PATENT NO. : 8,254,249 B2  
APPLICATION NO. : 12/537115  
DATED : August 28, 2012  
INVENTOR(S) : Wen et al.

Page 1 of 1

It is certified that error appears in the above-identified patent and that said Letters Patent is hereby corrected as shown below:

In Column 3, Line 45, delete "and a" and insert -- and/or a --, therefor.

In Column 4, Line 5, delete "and" and insert -- and/or --, therefor.

In Column 7, Line 5, delete "enqueing" and insert -- enqueuing --, therefor.

In Column 9, Line 28, in Claim 4, delete "enqueueing" and insert -- enqueuing --, therefor.

Signed and Sealed this  
Nineteenth Day of February, 2013

Teresa Stanek Rea  
*Acting Director of the United States Patent and Trademark Office*